United States Patent [19]
Kobylivker et al.

[11] Patent Number: 5,460,884
[45] Date of Patent: Oct. 24, 1995

[54] SOFT AND STRONG THERMOPLASTIC POLYMER FIBERS AND NONWOVEN FABRIC MADE THEREFROM

[75] Inventors: Peter M. Kobylivker, Marietta; Simon K. Ofosu, Lilburn; Susan E. Shawver, Roswell; Roger L. Lance, Buford, all of Ga.

[73] Assignee: Kimberly-Clark Corporation, Neenah, Wis.

[21] Appl. No.: 295,576

[22] Filed: Aug. 25, 1994

[51] Int. Cl.⁶ .................................................. D02G 3/00
[52] U.S. Cl. .......................... 428/373; 428/374; 428/394
[58] Field of Search .................................. 428/373, 374, 428/394

[56]                    References Cited
                 U.S. PATENT DOCUMENTS

| | | | |
|---|---|---|---|
| 3,338,992 | 8/1967 | Kinney | 264/24 |
| 3,341,394 | 9/1967 | Kinney | 161/72 |
| 3,502,763 | 3/1970 | Hartmann | 264/210 |
| 3,657,062 | 4/1972 | Eshima et al. | 428/374 |
| 3,692,618 | 9/1972 | Dorschner et al. | 161/72 |
| 3,802,817 | 4/1974 | Matsuki et al. | 425/66 |
| 3,849,241 | 11/1974 | Buntin et al. | 161/169 |
| 3,900,678 | 8/1975 | Aishima et al. | 428/374 |
| 3,909,009 | 9/1975 | Cvetko et al. | 274/37 |
| 4,041,203 | 8/1977 | Brock et al. | 428/157 |
| 4,115,620 | 9/1978 | Gupta et al. | 428/374 |
| 4,211,819 | 7/1980 | Kunimune et al. | 428/374 |
| 4,340,563 | 7/1982 | Appel et al. | 264/518 |
| 4,563,392 | 7/1986 | Harpell et al. | 428/373 |
| 4,632,861 | 12/1986 | Vassilatos | 428/296 |
| 4,634,739 | 1/1987 | Vassilatos | 525/240 |
| 4,695,503 | 9/1987 | Liu et al. | 428/207 |
| 4,766,029 | 8/1988 | Brock et al. | 428/374 |
| 4,795,668 | 1/1989 | Krueger et al. | 428/174 |
| 4,818,587 | 4/1989 | Ejima et al. | 428/198 |
| 4,822,668 | 4/1989 | Tanaka et al. | 428/283 |
| 4,830,904 | 5/1989 | Gessner et al. | 428/219 |
| 4,839,228 | 6/1989 | Jezic et al. | 428/401 |
| 4,900,857 | 2/1990 | Klett | 556/405 |
| 4,908,251 | 3/1990 | Iimura et al. | 428/68 |
| 4,948,841 | 8/1990 | Kasahara et al. | 525/240 |
| 5,002,815 | 3/1991 | Yamanaka et al. | 428/109 |
| 5,082,720 | 1/1992 | Hayes | 428/224 |

(List continued on next page.)

FOREIGN PATENT DOCUMENTS

| | | | |
|---|---|---|---|
| 0604736A2 | of 0000 | European Pat. Off. . | |
| 351318 | 1/1990 | European Pat. Off. | 428/373 |
| 0444671A2 | 9/1991 | European Pat. Off. | C08F 297/08 |
| 0472946A2 | 3/1992 | European Pat. Off. | C08F 297/08 |
| 518690 | 12/1992 | European Pat. Off. | 428/373 |
| 3544523 | 6/1986 | Germany . | |
| 3243324 | 10/1988 | Japan | 428/373 |
| 2091217 | 3/1990 | Japan | 428/373 |
| 2191720 | 7/1990 | Japan | 428/394 |
| 90/10672 | 9/1990 | WIPO . | |
| 91/16374 | 10/1991 | WIPO . | |

OTHER PUBLICATIONS

Plastics Technology's Manufacturer's Handbook and Buyers Guide—199/95 from Bill Publications—355 Park Avenue South, N.Y. N.Y. 10010.
*Dictionary of Fiber and Textile Tech.*, pp. 13 and 14.
*Polymer blends and Composites*, by John A. Mason and Leslie H. Sperling, 1976, pp. 273–277.

Primary Examiner—Patrick J. Ryan
Assistant Examiner—J. M. Gray
Attorney, Agent, or Firm—James B. Robinson

[57]                    ABSTRACT

A nonwoven fiber and fabric are provided wherein the fabric has comparable strength characteristics to conventional fabrics yet is softer. The fibers are are a blend of a high crystallinity polypropylene polymer and a random block copolymer of polypropylene and polyethylene. The fabric of this invention may be laminated to other spunbond layers, meltblown nonwoven fabrics or films.

The nonwoven fabric of this invention may be used in products such as, for example, garments, personal care products, medical products, protective covers and outdoor fabrics.

5 Claims, 2 Drawing Sheets

U.S. PATENT DOCUMENTS

| | | | |
|---|---|---|---|
| 5,108,820 | 4/1992 | Kaneko et al. | 428/198 |
| 5,108,827 | 4/1992 | Gessner | 428/219 |
| 5,133,917 | 7/1992 | Jezic et al. | 428/373 |
| 5,141,802 | 8/1992 | Parrinello et al. | 428/288 |
| 5,169,706 | 12/1992 | Collier et al. | 428/152 |
| 5,188,895 | 2/1993 | Nishino et al. | 428/373 |
| 5,271,883 | 12/1993 | Timmons et al. | 428/6 |
| 5,275,884 | 1/1994 | Nishino et al. | 428/374 |
| 5,302,454 | 4/1994 | Cecchin et al. | 428/402 |
| 5,336,552 | 8/1994 | Strack et al. | 428/224 |
| 5,368,927 | 11/1994 | Lesca et al. | 428/288 |

SOFT AND STRONG THERMOPLASTIC POLYMER FIBERS AND NONWOVEN FABRIC MADE THEREFROM

BACKGROUND OF THE INVENTION

This invention relates generally to fibers and the nonwoven fabric or web which is formed from such fibers of a thermoplastic resin, and laminates using such a web as a component.

Thermoplastic resins have been extruded to form fibers, fabrics and webs for a number of years. The most common thermoplastics for this application are polyolefins, particularly polypropylene. Other materials such as polyesters, polyetheresters, polyamides and polyurethanes are also used to form nonwoven fabrics.

Nonwoven fabrics or webs are useful for a wide variety of applications such as diapers, feminine hygiene products, towels, and recreational or protective fabrics. The nonwoven fabrics used in these applications are often in the form of laminates like spunbond/meltblown/spunbond (SMS) laminates. The strength of a nonwoven fabric is one of the most desired characteristics. Higher strength webs allow thinner layers of material to be used to give strength equivalent to a thicker layer, thereby giving the consumer of any product of which the web is a part, a cost, bulk and weight savings. It is also very desirable that such webs, especially when used in consumer products such as diapers or feminine hygiene products, be very soft.

It is an object of this invention to provide a polypropylene nonwoven fabric or web which is very strong and yet is also very soft.

SUMMARY OF THE INVENTION

A very strong yet soft nonwoven polypropylene fiber is provided. A fabric is also provided which is a web of the fibers which are produced from a blend of polyolefin polymers. One polymer is a highly crystalline polypropylene. The second polymer is a copolymer of polypropylene and polyethylene in which the ethylene has a random and block distribution, hence a "random block copolymer".

A fabric made from fibers of the above blend is surprisingly strong, believed by the inventors to be due to incomplete melting at the bond points during bonding because of the high crystallinity of the polypropylene.

The nonwoven fabric of this invention may be used in products such as, for example, garments, personal care products, medical products, protective covers and outdoor fabrics.

DEFINITIONS

As used herein the term "nonwoven fabric or web" means a web having a structure of individual fibers or threads which are interlaid, but not in a regular, repetitive manner as in a knitted fabric. Nonwoven fabrics or webs have been formed from many processes such as for example, meltblowing processes, spunbonding processes, and bonded carded web processes. The basis weight of nonwoven fabrics is usually expressed in ounces of material per square yard (osy) or grams per square meter (gsm) and the fiber diameters useful are usually expressed in microns. (Note that to convert from osy to gsm, multiply osy by 33.91).

As used herein the term "microfibers" means small diameter fibers having an average diameter not greater than about 50 microns, for example, having an average diameter of from about 0.5 microns to about 50 microns, or more particularly, microfibers may have an average diameter of from about 2 microns to about 40 microns. The diameter of, for example, a polypropylene fiber given in microns, may be converted to denier by squaring, and multiplying the result by 0.00629, thus, a 15 micron polypropylene fiber has a denier of about 1.42 ($15^2 \times 0.00629 = 1.415$).

As used herein the term "spunbonded fibers" refers to small diameter fibers which are formed by extruding molten thermoplastic material as filaments from a plurality of fine, usually circular capillaries of a spinnerette with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. Nos. 3,502,763 and 3,909,009 to Levy, and U.S. Pat. No. 3,542,615 to Dobo et al. Spunbond fibers are generally continuous and larger than 7 microns in diameter, more particularly, they are usually between about 10 and 20 microns.

As used herein the term "meltblown fibers" means fibers formed by extruding a molten thermoplastic material through a plurality of fine, usually circular, die capillaries as molten threads or filaments into converging high velocity gas (e.g. air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Butin. Meltblown fibers are microfibers which are generally smaller than 10 microns in diameter.

As used herein the term "bicomponent" refers to fibers which have been formed from at least two polymers extruded from separate extruders but spun together to form one fiber. The configuration of such a bicomponent fiber may be, for example, a sheath/core arrangement wherein one polymer is surrounded by another or may be a side by side arrangement as illustrated in U.S. Pat. No. 5,108,820 to Kaneko et al., or an "islands-in-the-sea" arrangement. The polymers may be present in ratios of 75/25, 50/50, 25/75 or any other desired ratios.

As used herein the term "biconstituent fibers" refers to fibers which have been formed from at least two polymers extruded from the same extruder as a blend. Biconstituent fibers are sometimes referred to as multiconstituent fibers and usually have fibrils of one of the polymers within a matrix of the major polymer. Fibers of this general type are discussed in, for example, U.S. Pat. No. 5,108,827 to Gessner.

As used herein the term "blend" means a mixture of two or more polymers while the term "alloy" means a sub-class of blends wherein the components are immiscible but have been compatibilized. "Miscibility" and "immiscibility" are defined as blends having negative and positive values, respectively, for the free energy of mixing. Further, "compatibilization" is defined as the process of modifying the interfacial properties of an immiscible polymer blend in order to make an alloy. Note that a fiber formed from a blend of polymers need not have the fibrils characteristic of biconstituent fibers.

As used herein, the term "machine direction" or MD means the length of a fabric as it is produced. The term "cross machine direction" or CD means the width of fabric, i.e. a direction generally perpendicular to the MD.

As used herein, the term "garment" means any type of apparel which may be worn. This includes industrial work wear and coveralls, undergarments, pants, shirts, jackets, gloves, socks, and the like.

As used herein, the term "medical product" means surgical gowns and drapes, face masks, head coverings, shoe coverings wound dressings, bandages, sterilization wraps, and the like for medical, dental or veterinary applications.

As used herein, the term "personal care product" means wipers, diapers, training pants, absorbent underpants, adult incontinence products, and feminine hygiene products.

As used herein, the term "protective cover" means a cover for vehicles such as cars, trucks, boats, airplanes, motorcycles, bicycles, golf carts, etc., covers for equipment often left outdoors like grills, yard and garden equipment (mowers, roto-tillers, etc.) and lawn furniture, as well as floor coverings, table cloths and picnic area covers.

As used herein, the term "outdoor fabric" means a fabric which is primarily, though not exclusively, used outdoors. Outdoor fabric includes fabric used in protective covers, camper/trailer fabric, tarpaulins, awnings, canopies, tents, agricultural fabrics and outdoor apparel such as head coverings, industrial work wear and coveralls, pants, shirts, jackets, gloves, socks, shoe coverings, and the like.

TEST METHODS

Cup Crush: The softness of a nonwoven fabric may be measured according to the "cup crush" test. A lower cup crush value indicates a softer material. The cup crush test evaluates fabric stiffness by measuring the peak load required for a 4.5 cm diameter hemispherically shaped foot to crush a 23 cm by 23 cm piece of fabric shaped into an approximately 6.5 cm diameter by 6.5 cm tall inverted cup while the cup shaped fabric is surrounded by an approximately 6.5 cm diameter cylinder to maintain a uniform deformation of the cup shaped fabric. The foot and the cup are aligned to avoid contact between the cup walls and the foot which could affect the peak load. The peak load is measured while the foot is descending at a rate of about 0.25 inches per second (38 cm per minute). A suitable device for measuring cup crush is a model FTD-G-500 load cell (500 gram range) available from the Schaevitz Company, Pennsauken, N.J. Cup crush is measured in grams.

Tensile: The tensile strength of a fabric may be measured according to the ASTM test D-1682-64. This test measures the peak strength in pounds and elongation in percent of a fabric.

Melt Flow Rate: The melt flow rate (MFR) is a measure of the viscosity of a polymers. The MFR is expressed as the weight of material which flows from a capillary of known dimensions under a specified load or shear rate for a measured period of time and is measured in grams/10 minutes at 230° C. according to, for example, ASTM test 1238, condition E.

DETAILED DESCRIPTION

Figure 1:
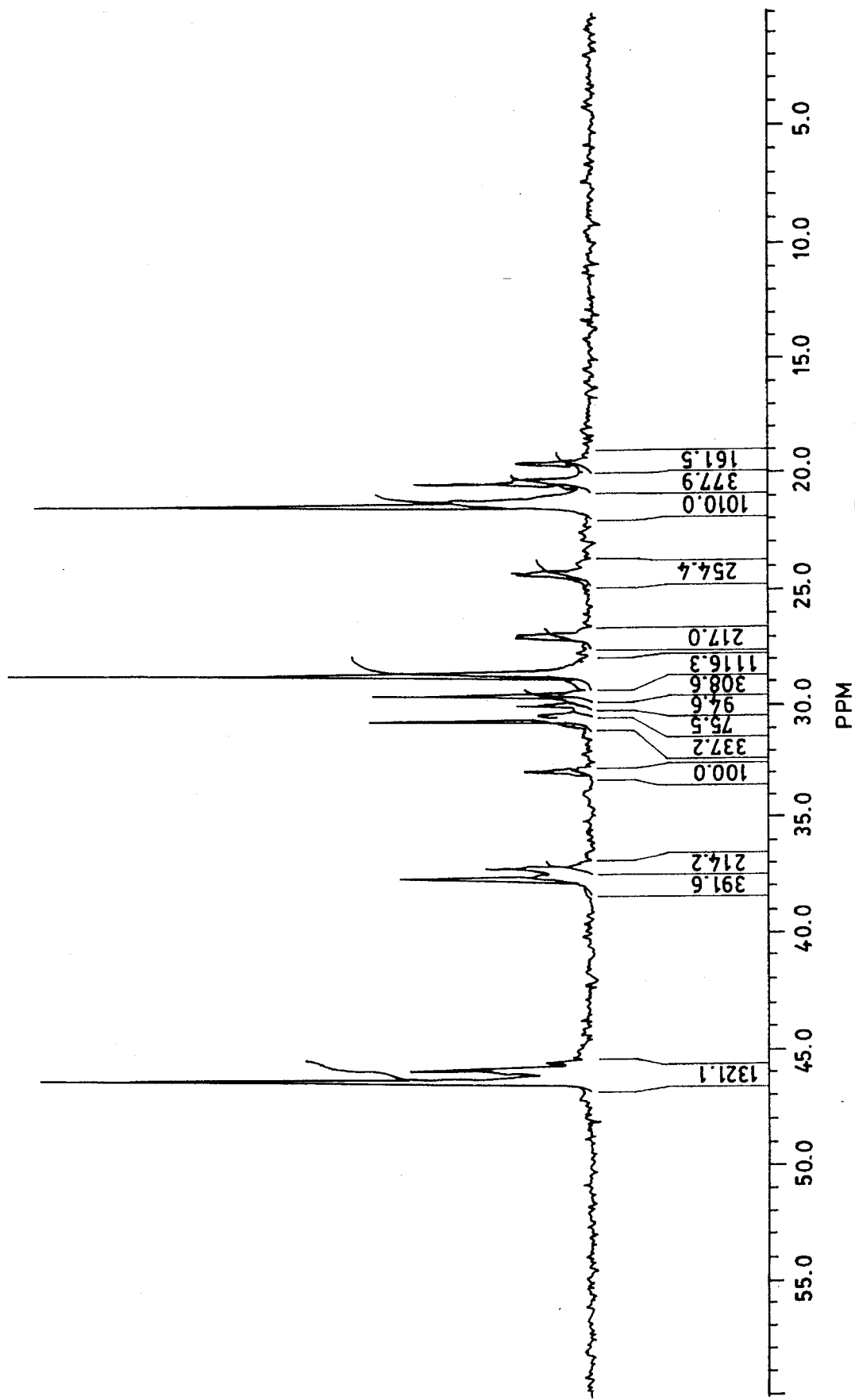
FIG. 1 is a graph of the carbon 13 Nuclear Magnetic Resonance (NMR) spectrum of Himont KSO-050 with ppm from 0 to 60 as the horizontal axis and using tertiarymethylsilane as the carrier and performed in a manner known in the art on a Bruker AC-250 NMR spectrometer.

It is preferred that the fibers and nonwoven fabric of this invention be produced by the method of spunbonding. The fibers and fabric of this invention are formed from a high crystalline polypropylene and a random block copolymer in amounts of from about 95 and 5 weight percent respectively, to about 50 and 50 weight percent respectively.

The important properties of polyolefins used in the spunbonding process are known to those skilled in the art. The melt flow rate, viscosity, and the percentage of isotactic polymer versus total polymer are quite important in characterizing a polymer.

The melt flow rate is related to the viscosity of the polymer with a higher number indicating a lower viscosity. The test for the melt flow rate is defined above.

Another measure of the crystallinity of a polymer is the percentage of isotactic polymer versus total polymer. This is referred to as the isotacticity or isotactic index and may be calculated from the nuclear magnetic resonance spectrum for a polymer. It has been found that polymers used in the practice of this invention must have an isotacticity of at least about 98%.

It is believed that the higher crystallinity polypropylene, versus typical polypropylene, has a peak melt temperature which is shifted upward by 6°–7° C., and an increase in enthalpy of about 20%. Such increases allow enough material to melt to participate in the bonding process but also retain enough of the properties of a fiber to maintain the strength.

The spunbond process generally uses a hopper which supplies polymer to a heated extruder. The extruder supplies melted polymer to a spinnerette where the polymer is fiberized as it passes through fine openings arranged in one or more rows in the spinnerette, forming a curtain of filaments. The filaments are usually quenched with air at a low pressure, drawn, usually pneumatically and deposited on a moving foraminous mat, belt or "forming wire" to form the nonwoven fabric. Polymers typically of use in the spunbond process generally have a processing temperature of between about 350° F. to about 610° F. (175° C. to 320° C.).

The fibers produced in the spunbond process are usually in the range of from about 10 to about 20 microns in diameter, depending on process conditions and the desired end use for the fabrics to be produced from such fibers. For example, increasing the polymer molecular weight or decreasing the processing temperature result in larger diameter fibers. Changes in the quench fluid temperature and pneumatic draw pressure can also affect fiber diameter. In this invention, the particular polymer used allows the fibers to be produced at a smaller diameter than usual for spunbonding.

Spunbond fibers are generally bonded together to consolidate them into a coherent layer. Thermal and ultrasonic bonding are the preferred means of bonding in the practice of this invention, though other methods like hydroentanglement, needlepunch bonding and adhesive bonding may be used. Even though high crystallinity polypropylene has a higher melting point than typical polypropylene used for spunbond fabrics, no special bonding conditions were used in making the fabric of this invention and bonding was carried out at approximately the same temperature as conventional polypropylene. The inventors believe, though they do not want their invention to be bound by this belief, that the low melting point random block copolymer preferentially melts at the bond points to create the bond while the high crystallinity polypropylene remains preferentially less melted in order to help maintain the strength of the web. This ensures a strong fabric yet also provides sufficient bond area to function in holding the fabric together.

The fabric of this invention may be used in a single layer embodiment having a basis weight of between about 0.3 and 3.5 osy (10 and 119 gsm) or as a component of a multilayer laminate having a much higher basis weight. Such a laminate may include other spunbond layers, meltblown layers, films, glass fibers, staple fibers, paper, and other commonly used materials known to those skilled in the art.

If the fabric is laminated with a film or meltblown layer, the film or meltblown layer may be comprised of polyurethane, polyester, polyetherester, polyamide or polyolefin and may be elastomeric. Specific examples of commercially available elastomeric polymers which may be used for films and meltblown fabrics include styrenic block polyolefin copolymers such as those known as KRATON® materials which are available from Shell Chemical Company of Houston, Tex., polyurethane elastomeric materials such as, for example, those designated ESTANE® from B. F. Goodrich & Co., polyamide elastomeric materials such as, for example, those available under the trademark PEBAX® from the Rilsan Company, and polyester elastomeric materials such as, for example, those available under the trade designation HYTREL® from E. I. DuPont De Nemours & Company.

A multilayer laminate may be formed by a number of different techniques including but not limited to using adhesive, needle punching, ultrasonic bonding, thermal calendering and any other method known in the art. A multilayer laminate embodiment wherein some of the layers are spunbond and some meltblown such as a spunbond/meltblown/spunbond (SMS) laminate is disclosed in U.S. Pat. No. 4,041,203 to Brock et al. and U.S. Pat. No. 5,169,706 to Collier, et al. Such a laminate may be made by sequentially depositing onto a moving conveyor belt or forming wire first a spunbond fabric layer, then a meltblown fabric layer and last another spunbond layer and then bonding the laminate in a manner described above. Alternatively, the three fabric layers may be made individually, collected in rolls, and combined in a separate bonding step.

Areas in which the fabric of this invention may find utility are garments, medical products, personal care products, and outdoor fabrics.

As discussed above, the polypropylene polymer useful in this invention must have high crystallinity, i.e., the isotacticity of this polypropylene polymer must be at least 98%. Such polypropylene polymers are available from a number of manufacturers throughout the world. One supplier is the Exxon Chemical Company of Baytown, Tex. which has available an experimental polypropylene polymer within the crystallinity requirement.

The fibers of this invention are blended thermoplastic polymer fibers, so the random block copolymer useful in this invention must be miscible with the high crystallinity polypropylene polymer and remain in a noncrystalline phase in a semicrystalline fiber. It preferred that no compatibilizer be used. In order to meet these criteria, suitable random block copolymers must have a melt temperature of less than 160° C. (320° F.). Suitable random block copolymers are available from the Himont Company of Wilmington, Delaware under the trade designation KSO-57P. Himont's KSO-57P has a melt flow rate of 30 and a density of 0.9 gm/cc, according to page 673 of *Plastic Technology's Manufacturers Handbook & Buyer's Guide,* 1994/95 from Bill Publications, 355 Park Ave. South, N.Y., N.Y., 10010.

Figure 2:
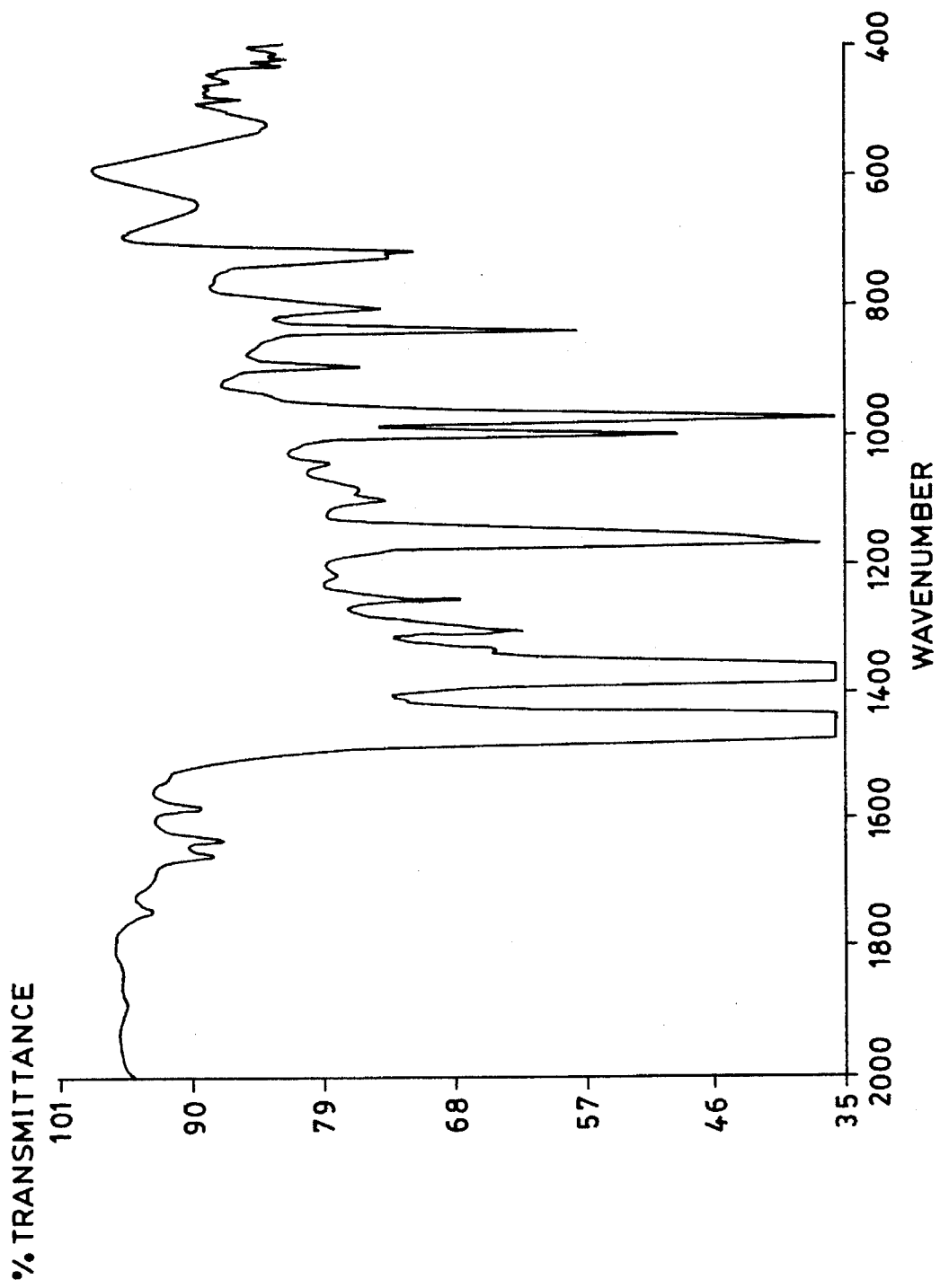
FIG. 2 is a graph of the infrared (IR) scan or curve of Himont KSO-050 random block copolymer having wavenumber from 400 to 2000 as the horizontal axis and percent transmittance from 35 to 101 as the vertical axis.

Polymers can be characterized in a number of ways, two of which being the nuclear magnetic resonance scan (NMR) and the infrared scan (IR). FIGS. 1 and 2 show these scans of the random block copolymer preferred in the practice of this invention, Himont's KSO-050, prior to peroxide cracking to produce KSO-57P. Peroxide cracking is a process for raising the melt flow rate of a polymer. An example of such a procedure is taught in U.S. Pat. No. 5,271,883 to Timmons.

The NMR spectrum and IR curve of the polymer show that KSO-57P has about 3 percent random ethylene molecules and about 9–10 percent block ethylene molecules, hence the term "random block copolymer", as mentioned above.

The following Examples show the characteristics of fibers from polymers which satisfy the requirements of this invention (examples 2,3,5 & 6) versus those that do not. The results are shown in Table 1.

EXAMPLE 1

A nonwoven spunbond fabric was produced with a basis weight (BW) of 0.7 osy (24 gsm). The fibers were made from Exxon Chemical Company's commercially available ESCORENE® 3445 polypropylene. The fibers were spun at a temperature of about 430° F. (221° C.). The spinnerette hole size was 0.6 mm with throughput of about 0.7 grams/hole/minute (ghm) to produce fiber of about 15 microns in diameter (1.4 denier). The fibers were thermally bonded by passing the web through a thermal calender at a temperature of 305° F. (152° C.) with a bond area of about 15%.

EXAMPLE 2

A nonwoven spunbond fabric was produced with a basis weight of 0.7 osy (24 gsm). The fibers were made from a mixture of Exxon Chemical Company's experimental highly crystalline high crystallinity polypropylene (HCP) and Himont's KSO-57P random block copolymer in a 80/20 ratio. The fibers were spun at a temperature of about 430° F. (221° C.). The spinnerette hole size was 0.6 mm with throughput between 0.7 and 0.9 grams/hole/minute (ghm) to produce fiber of 15.4 microns in diameter (1.5 denier). The fibers were thermally bonded by passing the web through a thermal calender at a temperature of 305° F. (152° C.) with a bond area of about 15%.

EXAMPLE 3

A nonwoven spunbond fabric was produced with a basis weight of 0.7 osy (24 gsm). The fibers were made from a mixture of Exxon Chemical Company's experimental highly crystalline polypropylene and Himont's KSO-57P random block copolymer in a 60/40 ratio. The fibers were spun at a temperature of about 430° F. (221° C.). The spinnerette hole size was 0.6 mm with throughput of about 0.7 grams/hole/minute (ghm) to produce fiber of 15.4 microns in diameter (1.5 denier). The fibers were thermally bonded by passing the web through a thermal calender at a temperature of 305° F. (152° C.) with a bond area of about 15%.

EXAMPLE 4

A nonwoven spunbond fabric was produced with a basis weight of 1.6 osy (54 gsm). The fibers were made from Exxon Chemical Company's ESCORENE® 3445 polypropylene. The fibers were spun at a temperature of about 430° F. (221° C.). The spinnerette hole size was 0.6 mm with throughput of about 0.7 grams/hole/minute (ghm) to produce fiber of 15 microns in diameter (1.4 denier). The fibers were thermally bonded by passing the web through a thermal calender at a temperature of 305° F. (152° C.) with a bond area of about 15%.

EXAMPLE 5

A nonwoven spunbond fabric was produced with a basis weight of 1.6 osy (54 gsm). The fibers were made from a mixture of Exxon Chemical Company's experimental highly crystalline polypropylene and Himont's KSO-57P random block copolymer in a 80/20 ratio. The fibers were spun at a temperature of about 430° F. (221° C.). The spinnerette hole size was 0.6 mm with throughput of about 0.7 grams/hole/minute (ghm) to produce fiber of 15.4 microns in diameter (1.5 denier). The fibers were thermally bonded by passing the web through a thermal calender at a temperature of 305° F. (152° C.) with a bond area of about 15%.

EXAMPLE 6

A nonwoven spunbond fabric was produced with a basis weight of 1.6 osy (54 gsm). The fibers were made from a mixture of Exxon Chemical Company's experimental highly crystalline polypropylene and Himont's KSO-57P random block copolymer in a 60/40 ratio. The fibers were spun at a temperature of about 430° F. (221° C.). The spinnerette hole size was 0.6 mm with throughput of about 0.7 grams/hole/minute (ghm) to produce fiber of 15 microns in diameter (1.4 denier). The fibers were thermally bonded by passing the web through a thermal calender at a temperature of 305° F. (152° C.) with a bond area of about 15%.

The data show that the spunbond fabrics made according to the invention exhibit strength comparable to conventional webs at lower basis and surprisingly superior to conventional webs at higher basis weights. This strength is exhibited while providing substantially lower cup crush values, indicating much improved softness. In fact, fabrics made according to the invention have softnesses at least 25 percent greater than conventional polypropylene fabrics, i.e., they have a cup crush value at least 25 percent less than that of a nonwoven web made from polypropylene alone.

The results show that spunbond fabrics made from fibers spun from the unique combination of a high crystalline polypropylene and a random block copolymer having the designated characteristics can have physical properties comparable to conventional polypropylene spunbond fabrics yet have greater softness.

We claim:

1. Bondable thermoplastic polymer fibers consisting essentially of a biconstituent blend of from about 95 to 50 weight percent polypropylene having an isotacticity of at least 98 percent, and from about 5 to 50 weight percent of a random block copolymer of propylene and ethylene having a melting point of below 160° C. and having about 3 percent random ethylene molecules and about 9 percent block ethylene molecules.

2. The fibers of claim 1 which are essentially free of a compatibilizer.

3. The fibers of claim 1 which are produced from a method chosen from the group consisting of spunbonding and meltblowing.

4. The fibers of claim 3 wherein said method is spunbonding.

5. The fibers of claim 1 wherein said random block copolymer has a melt flow rate of 30 and a density of 0.9 gm/cc.

TABLE 1

| No. | Sample Id | BW | CUP CRUSH | | CD | | | MD | | |
| | | | Energy | Load | Peak Load | Elongation | Fail Energy | Peak Load | Elongation | Fail Energy |
| --- | --- | --- | --- | --- | --- | --- | --- | --- | --- | --- |
| 1 | polypropylene | 0.7 | 1527 | 77.4 | 13.699 | 62.05 | 23.731 | 18.257 | 54.27 | 24.209 |
| 2 | 80/20(HCP,KS057P) | 0.7 | 1094 | 55.6 | 12.768 | 62.3 | 19.541 | 14.955 | 55.5 | 24.581 |
| 3 | 60/40(HCP,KS057P) | 0.7 | 612 | 34 | 8.591 | 69.83 | 14.453 | 9.928 | 54.75 | 19.056 |
| 4 | polypropylene | 1.6 | 7094 | 378 | 27.636 | 61.26 | 67.098 | 40.7 | 44.2 | 68.7 |
| 5 | 80/20(HCP,KS057P) | 1.6 | 5460 | 280 | 37.53 | 94.75 | 85.568 | 45.18 | 69.428 | 82.169 |
| 6 | 60/40(HCP,KS057P) | 1.6 | 3282 | 181 | 30.346 | 97.85 | 68.847 | 30.34 | 64.43 | 61.09 |

* * * * *

UNITED STATES PATENT AND TRADEMARK OFFICE
CERTIFICATE OF CORRECTION

PATENT NO. : 5,460,884

DATED : October 24, 1995

INVENTOR(S) : Peter M. Kobylivker, Simon K. Ofosu, Susan E. Shawver, Roger L. Lance It is certified that error appears in the above-identified patent and that said Letters Patent is hereby corrected as shown below:

Column 2, line 7, "$152^2$" should read -- $15^2$ --;

Column 3, line 51, "polymers" should read --polymer--.

Signed and Sealed this

Sixteenth Day of January, 1996

Attest:

BRUCE LEHMAN

Attesting Officer

Commissioner of Patents and Trademarks